Nov. 9, 1926.
W. FUHR
OIL BURNER
Filed May 4, 1925
1,606,021
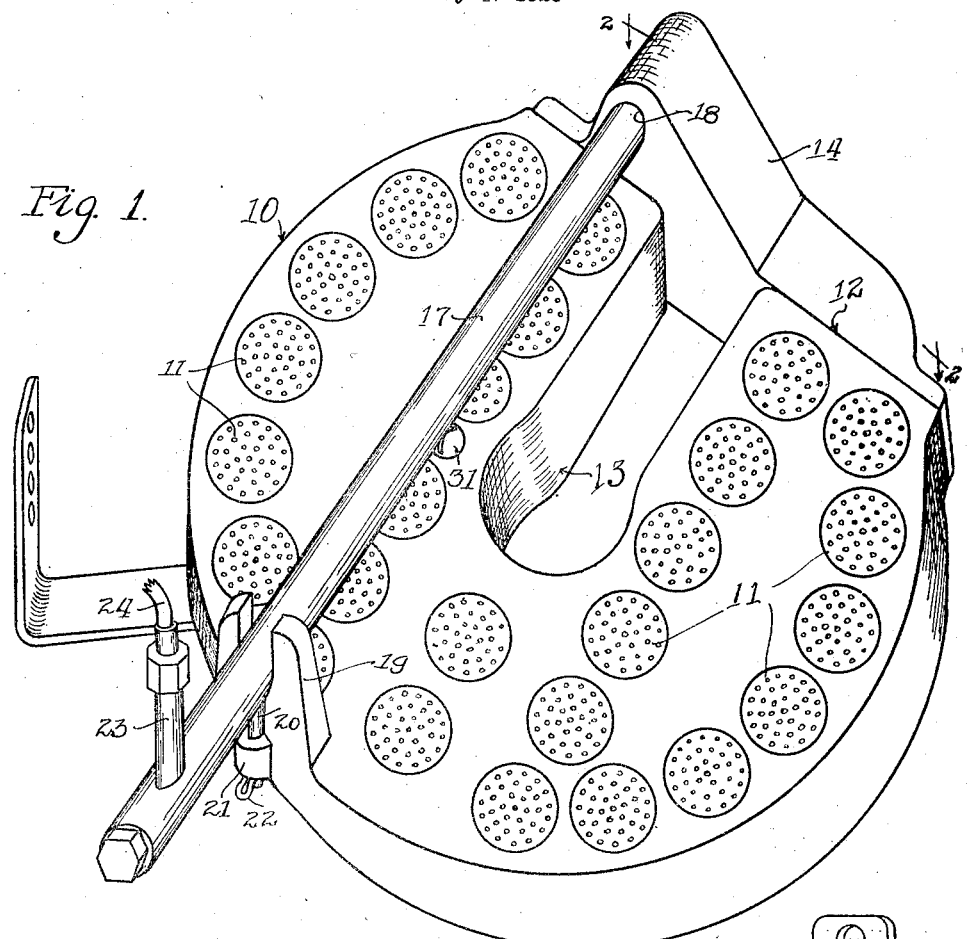
Fig. 1.
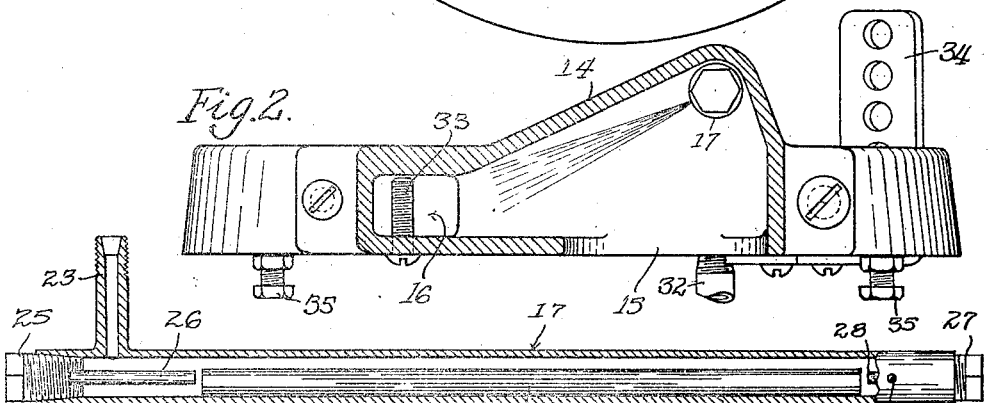
Fig. 2.
Fig. 3.
WITNESSES
INVENTOR
William Fuhr Patented Nov. 9, 1926.

1,606,021

UNITED STATES PATENT OFFICE.

WILLIAM FUHR, OF CHICAGO, ILLINOIS.

OIL BURNER.

Application filed May 4, 1925. Serial No. 27,622.

This invention relates to improvements in oil burners for general heating purposes, and more particularly to oil burners of the generator type, which burn with a clear blue flame and therefore are especially suitable for stoves, water heaters, and other heating devices heretofore utilizing gas as fuel.

Among the objects of the invention is to provide an improved type of gas generator, so constructed as to permit of easy removal for the purpose of cleaning, and provided with a heat retaining element capable of maintaining the generator at a high temperature so that the burner may be turned off for short intervals without the necessity of reheating the generator before the burner can be ignited.

In the accompanying drawings,

Figure 1 is a perspective view of the burner;

Figure 2 is a view of the burner in rear elevation with the mixing chamber shown in section as taken on line 2, 2 of Figure 1; and Figure 3 is a view in longitudinal section of the hot tube or gas generator removed.

Referring now to the drawings, the burner proper consists of a flat hollow casing 10 of circular form with a plurality of perforated lava discs 11 in its top wall and forming the gas orifices. One side of the burner casing is flattened as at 12 and has a radial slot or opening 13, extending to the center thereof, giving it somewhat the shape of a horse-shoe. A housing 14 is bolted to the flat side of the casing and forms the mixing chamber of the burner. As clearly shown in Figure 2, the housing is a hollow casting having an air inlet opening 15 in its bottom wall, near one end, and an outlet opening 16 in its forward side wall and near its opposite end and registering with a corresponding opening in the flat wall of the casing 10 leading to one branch or leg of the horse-shoe-shaped burner. The top wall of the housing 14 slopes upwardly and laterally from a point above the discharge opening 16 into the burner, thus forming an inverted V-shaped top surface at the apex of which is located the discharge end of the generator presently to be described.

The gas generator consists of a tube 17, preferably of iron and extending substantially diametrically above the top of the burner 10, one end projecting through an opening 18 in the housing 14, and the other supported in an U-shaped bracket 19 formed integral with the casing 10, opposite the housing 14. On the underside of the generator tube is a stud 20, which passes through a lug 21 on the edge of the casing 10, just below the bracket 19, and serves to lock the generator in place by means of a cotter pin 22 inserted through a hole in the stud below the lug 21.

At the inlet end of the generator tube is a nipple 23, having suitable connection with a relatively light copper tube 24, leading from the fuel tank (not shown). Secured into the adjacent end of the tube is a plug 25 having a pin 26 supported thereby and projecting axially of the tube a short distance beyond the nipple 23. A similar plug and pin 27 and 28 are mounted in the opposite end of the tube. A small discharge orifice 29 is formed near the outlet end of the tube and located as shown in Figure 2, within the housing 14, and directed toward the opening 16 into the burner casing 10. Lying in the bottom of the tube 17 is a solid rod 30, of a less diameter than the tube but of a size adequate to prevent the fuel from jumping or surging along the tube as it is heated to the temperature of gasification, and thus causing a varying or pulsating flame. Furthermore, the rod serves to retain the heat so that when the burner is extinguished during the interval required for refilling the fuel tank, the tube remains hot enough to start the gas generation when the fuel is turned on again without again heating the tube. The pins 26 and 28 serve to retain the rod 30 in place, and prevent it working endwise toward the fuel inlet or outlet.

Immediately below the generator-tube is a pilot burner 31, passing upwardly through the casing 10, and connected with a gas-supply-pipe 32. This pilot is so located as to heat the central portion of the tube, although in localities where gas is not available, it is necessary to remove the generator tube and preheat it by other means.

The fuel thus gasified in the tube is discharged through the orifice 29, toward the inlet opening 16 to the casing 10, drawing in the air through the opening 15 in the bottom of the housing 14, the mixture of air and gas taking place immediately before it is discharged into the opening 16 to the casing 10.

It will be noted that a screw 33 is located in the opening 16 to the casing, this screw acting as a baffle for dividing the gas into two streams, one following a path around the outer wall of the casing and the other following the inner wall; thus preventing what is termed "backlashing", that is, the gas tending to follow a continuous path around the outside of the casing and returning along the inner wall to the inlet and setting up a counter flow to the incoming gas.

The burner is started by just heating the generator tube for a short period of time by the pilot flame and then turning on the fuel supply, the gas issuing from the small perforations in the lava discs being ignited by a match or by the pilot flame and burning in groups of small blue flames. Once ignited, the burner keeps the generator tube hot, the same being located immediately above a row of the lava discs on one side of the slot 13, as shown in Figure 1.

To clean the orifice of carbon deposits, the generator tube is disconnected from the burner by removing the cotter pin 22 and withdrawing the end of the tube from the housing 14. Likewise the interior of the tube can be cleaned by unscrewing the plugs at each end, driving out the rod, scraping off the carbon and then using the rod to scrape the carbon from the inside of the tube.

Suitable brackets 34 on the sides of the casing 10, and adjustable feet 35 on the underside thereof, serve to support the burner within the stove or heater. In a water heater having a vertical pipe extending centrally from the coil or heating sections, the burner is readily installed by removing the housing 14 and slipping the casing around the pipe, which fits within the rounded end of the slot 13.

I claim as my invention:

1. An oil burner comprising a relatively flat casing, having burner elements in the top wall thereof, a vaporizing chamber at one edge of said casing and communicating therewith through an inlet opening and having a portion extending above the top wall of said casing, a vaporizing tube extending across the top of said casing with one end inserted into said vaporizing chamber, and provided at said end with a discharge orifice adapted to be directed toward said inlet opening to said casing.

2. An oil burner comprising a casing having a plurality of burner elements in its top surface, a mixing chamber at the edge of said casing and communicating with said casing, a generator tube extending across the top surface of said casing above a row of said burner elements, and a vaporizing tube extending transversely above said casing and provided at its discharge end with a laterally opening orifice, said mixing chamber having a portion extending above said casing and provided with an opening to receive the discharge end of said vaporizing tube.

3. An oil burner comprising a relatively flat casing of substantially circular shape, having a plurality of burner discs in its top wall and a flattened edge portion having an inlet opening therein, a housing removably secured against said flattened edge, and communicating with said inlet opening, and a generator tube removably mounted above said casing and having one end provided with a discharge orifice and adapted to be inserted through an opening in said housing with said orifice directed toward said inlet opening.

4. An oil burner comprising a relatively flat casing of substantially circular shape having a radial slot, a housing secured to the edge of said casing across the entrance to said slot and communicating with said casing through a lateral inlet opening on one side of said slot, a series of burner elements in the top wall of said casing, and arranged in an outer row following around the periphery of said casing from said inlet opening, and an inner row following around the slot, a generator tube mounted above the top wall of said casing and having one end communicating with said housing, and a baffle member located in the entrance to said casing whereby the gas entering therethrough is divided to follow said outer and inner rows of burner elements.

Signed at Chicago, Ill., this 18th day of April, 1925.

WILLIAM FUHR.